United States Patent
Dusterhoft et al.

(10) Patent No.: US 12,091,967 B2
(45) Date of Patent: Sep. 17, 2024

(54) USING FIBER OPTIC SENSING TO ESTABLISH LOCATION, AMPLITUDE AND SHAPE OF A STANDING WAVE CREATED WITHIN A WELLBORE

(71) Applicant: Halliburton Energy Services, Inc., Houston, TX (US)

(72) Inventors: Ronald Glen Dusterhoft, Houston, TX (US); Stanley Vernon Stephenson, Duncan, OK (US); Mikko K. Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 176 days.

(21) Appl. No.: 17/829,935

(22) Filed: Jun. 1, 2022

(65) Prior Publication Data
US 2023/0392482 A1    Dec. 7, 2023

(51) Int. Cl.
| | | |
|---|---|---|
| *E21B 47/18* | (2012.01) | |
| *E21B 43/26* | (2006.01) | |
| *E21B 47/135* | (2012.01) | |
| *G01V 1/04* | (2006.01) | |
| *G01V 1/40* | (2006.01) | |

(52) U.S. Cl.
CPC .......... *E21B 47/18* (2013.01); *E21B 43/2607* (2020.05); *E21B 47/135* (2020.05); *G01V 1/04* (2013.01); *G01V 1/40* (2013.01)

(58) Field of Classification Search
CPC ............. E21B 47/135; E21B 47/14–24; E21B 43/2607
See application file for complete search history.

(56) References Cited

U.S. PATENT DOCUMENTS

| | | | |
|---|---|---|---|
| 6,347,283 B1 | 2/2002 | Soliman et al. | |
| 6,724,687 B1 | 4/2004 | Stephenson et al. | |
| 7,313,481 B2 * | 12/2007 | Moos ................. | G01N 15/0826 |
| | | | 73/152.22 |

(Continued)

FOREIGN PATENT DOCUMENTS

| | | | | |
|---|---|---|---|---|
| BR | PI0406775 A | * | 12/2005 | ............. G01D 5/353 |
| WO | WO-2006000742 A1 | * | 1/2006 | ............. E21B 37/08 |

(Continued)

*Primary Examiner* — Jennifer H Gay
(74) *Attorney, Agent, or Firm* — John Wustenberg; Parker Justiss, P.C.

(57) ABSTRACT

Introduced herein are system and method for precisely determining the actual location of a standing wave created within a wellbore as well as other key properties about the created wave. The introduced system and method utilize a fiber optic sensing system, such as fiber optic Distributed Acoustic Sensing (DAS) system, that actively interrogates and monitors fiber optic sensors along the length of a wellbore. The introduced system and method generate one or more pressure pulses that combine with one another to create a standing wave within a wellbore and process the acoustic response of the standing wave using the fiber optic DAS system over a wide range of frequencies. Based on the measurements, the introduced system and method determine the actual location of the created standing wave and move it to a desired location within the wellbore by adjusting one or more properties of the pressure pulses.

25 Claims, 4 Drawing Sheets

(56) References Cited

U.S. PATENT DOCUMENTS

| | | | | |
|---|---|---|---|---|
| 7,946,341 B2* | 5/2011 | Hartog | | E21B 47/135 |
| | | | | 340/854.6 |
| 8,225,867 B2* | 7/2012 | Hartog | | E21B 41/0064 |
| | | | | 340/854.6 |
| 8,347,958 B2* | 1/2013 | Hartog | | G01V 1/226 |
| | | | | 340/854.6 |
| 8,807,960 B2 | 8/2014 | Stephenson et al. | | |
| 9,255,836 B2* | 2/2016 | Taverner | | G02B 6/02395 |
| 10,641,090 B2* | 5/2020 | Felkl | | E21B 49/008 |
| 10,914,156 B2 | 2/2021 | Coats et al. | | |
| 11,143,005 B2 | 10/2021 | Dusterhoft et al. | | |
| 11,346,197 B2* | 5/2022 | Stephenson | | F04B 23/04 |
| 11,434,730 B2* | 9/2022 | Surjaatmadja | | E21B 43/26 |
| 2004/0256097 A1* | 12/2004 | Byrd | | E21B 43/16 |
| | | | | 507/200 |
| 2009/0114386 A1* | 5/2009 | Hartog | | E21B 41/0064 |
| | | | | 166/250.01 |
| 2011/0188344 A1* | 8/2011 | Hartog | | G01V 1/226 |
| | | | | 367/27 |
| 2012/0046866 A1* | 2/2012 | Meyer | | E21B 28/00 |
| | | | | 702/6 |
| 2012/0057432 A1* | 3/2012 | Hill | | G01V 1/50 |
| | | | | 367/101 |
| 2012/0277995 A1* | 11/2012 | Hartog | | E21B 47/06 |
| | | | | 702/8 |
| 2015/0027727 A1 | 1/2015 | Stephenson et al. | | |
| 2017/0342823 A1* | 11/2017 | Shah | | E21B 33/12 |
| 2018/0252097 A1* | 9/2018 | Skinner | | E21B 47/135 |
| 2019/0316455 A1 | 10/2019 | Surjaatmadja et al. | | |
| 2019/0316456 A1 | 10/2019 | Beisel et al. | | |
| 2020/0263537 A1* | 8/2020 | Boone | | E21B 43/10 |
| 2020/0277951 A1 | 9/2020 | Hunter et al. | | |
| 2021/0032979 A1* | 2/2021 | Granville | | G01V 11/002 |
| 2021/0040841 A1 | 2/2021 | Dusterhoft et al. | | |
| 2021/0123431 A1 | 4/2021 | Jaaskelainen et al. | | |
| 2021/0254439 A1* | 8/2021 | Surjaatmadja | | E21B 43/26 |
| 2021/0277760 A1* | 9/2021 | Stephenson | | F04B 17/03 |
| 2021/0348491 A1 | 11/2021 | Stephenson et al. | | |
| 2021/0364669 A1 | 11/2021 | Dusterhoft et al. | | |
| 2022/0112797 A1 | 4/2022 | Beuterbaugh et al. | | |
| 2023/0147476 A1* | 5/2023 | Wheelock | | E21B 47/26 |
| | | | | 367/82 |
| 2023/0392482 A1* | 12/2023 | Dusterhoft | | E21B 47/18 |
| 2024/0018866 A1* | 1/2024 | Schaeffer | | G01L 1/242 |

FOREIGN PATENT DOCUMENTS

| | | | | |
|---|---|---|---|---|
| WO | WO-2018035498 A1 * | 2/2018 | | E21B 43/26 |
| WO | WO-2018111231 A1 * | 6/2018 | | E21B 43/26 |
| WO | WO-2020018112 A1 * | 1/2020 | | E21B 43/114 |

* cited by examiner

USING FIBER OPTIC SENSING TO ESTABLISH LOCATION, AMPLITUDE AND SHAPE OF A STANDING WAVE CREATED WITHIN A WELLBORE

BACKGROUND

To produce hydrocarbons (for example, oil, gas, etc.) from a subterranean formation, wellbores may be drilled that penetrate hydrocarbon-containing portions of the subterranean formation. The portion of the subterranean formation from which hydrocarbons may be produced is commonly referred to as a "production zone." A subterranean formation penetrated by the wellbore may have multiple production zones at various locations along the wellbore.

Generally, after a wellbore has been drilled to a desired depth, completion operations are performed. Such operations may include inserting a liner or casing into the wellbore and cementing the casing or liner into place. Once the wellbore is completed as desired (lined, cased, open hole, or any other known completion), a stimulation operation may be performed to enhance hydrocarbon production into the wellbore.

Some common stimulation operations involve hydraulic fracturing of the formation and placement of a proppant in those fractures. Typically, a stimulation fluid (comprising at least a clean fluid and a proppant) is mixed at the surface before being pumped downhole in order to induce fractures or perforations in the formation of interest. The creation of such fractures or perforations will increase the production of hydrocarbons by increasing the flow paths in to the wellbore.

BRIEF DESCRIPTION

Reference is now made to the following descriptions taken in conjunction with the accompanying drawings, in which.

DETAILED DESCRIPTION

Figure 1:
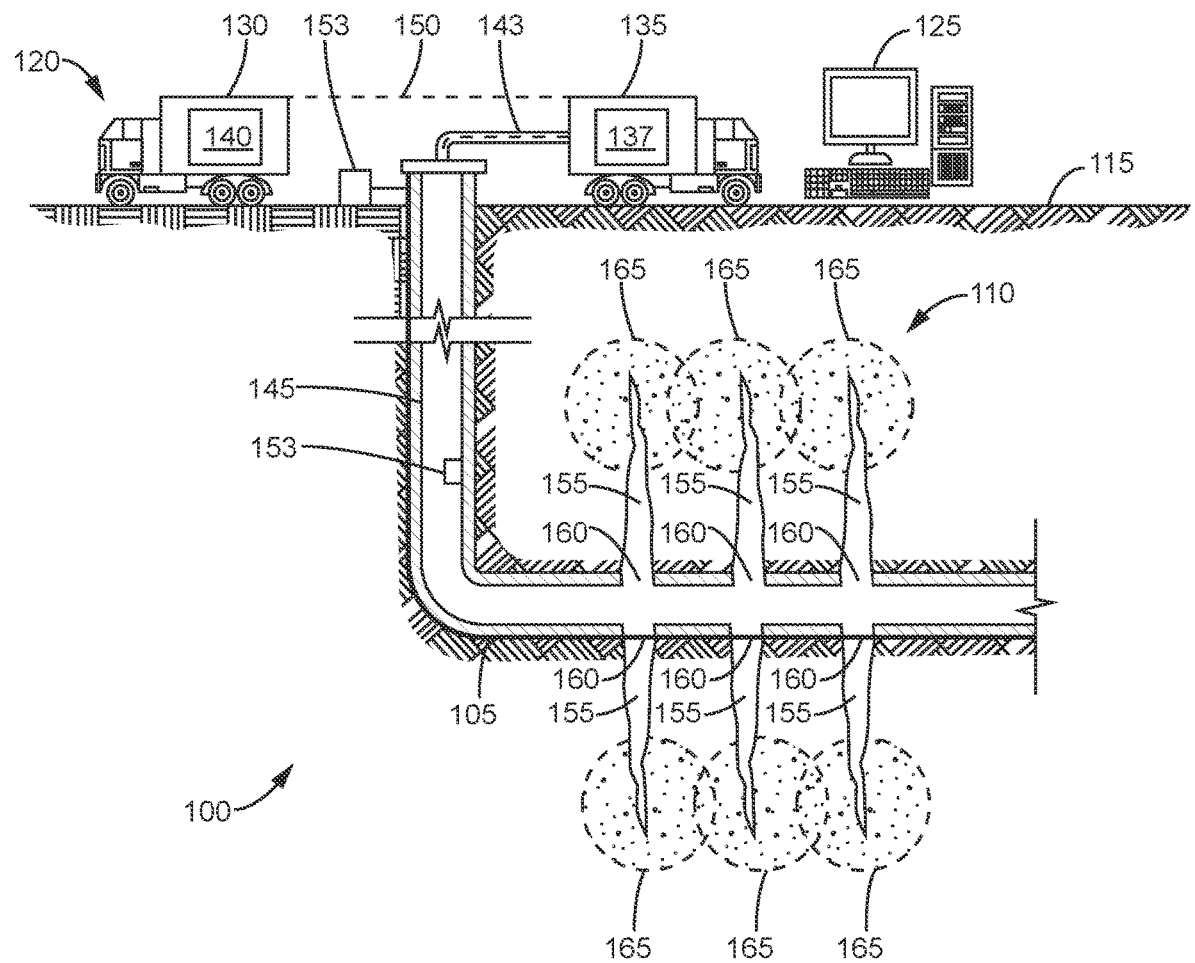
FIG. 1 illustrates an example of a well system for performing a stimulation operation according to the principles of the current disclosure.

During a stimulation operation, such as a hydraulic fracturing operation, creating a known wave at a known location within a wellbore and capturing its reflections and dampening can be utilized for interpreting wellbore and near wellbore conditions. Today, determining properties and location of the created wave within a wellbore completely relies on mathematical tools. While these tools are accurate to some degree, they by themselves also do not provide the exact location, amplitude and frequency of the created wave, and as a result, significant uncertainties must be factored into when interpreting the wellbore condition.

Introduced herein are system and method for precisely determining the actual location of the created wave within a wellbore as well as other key properties about the created wave, such as its amplitude, frequency and waveform. The introduced system and method utilizes a fiber optic sensing system, such as fiber optic Distributed Acoustic Sensing (DAS) system, that actively interrogates and monitors fiber optic cables along the length of a wellbore. More specifically, the introduced system and method create a standing wave within a wellbore by generating and combining one or more pressure pulses and process a response, e.g., acoustic response, to the created wave by making measurements, e.g., pressure and strain, along the entire length of the wellbore over a wide range of frequencies using the fiber optic DAS system. Based on the measurements, the introduced system and method determine the actual location of the created standing wave and move it to a desired location within the wellbore by adjusting one or more properties of the generated pressure waves/pulses.

By adjusting one or more properties of the generated pressure pulses/waves and hence creating a high-amplitude standing wave precisely at the desired location, the introduced system and method can: 1) determine perforation cluster efficiency, e.g., how many perforations are taking fluid, and formation breakdown characteristics of perforations at the desired location; 2) break down or fracture a specific portion of a wellbore with lower total hydraulic horse power (HHP) requirements and hence with lower pressure rated surface equipment while pumping at lower pressures on the surface; 3) during diversion, locate a node of the standing wave across perforations that do not need to take fluid and/or locate an anti-node of the standing wave across perforation that need to take a diverter; 4) sweep a node or anti-node of the standing wave back and forth across some perforations a) to cause local pressure oscillations of the fluid entering the perforations—this can enhance fracture growth with an anti-node or slow the growth with a node, and b) to determine which perforations are taking more fluid and which are taking less fluid, by monitoring for a drop in the treating pressure at or near the desired location; 5) balance the fluid among different clusters by adjusting the ratio of localized pressure at each cluster based on the location of each cluster relative to a node or anti-node of the standing wave; and 6) correlate timing and perforation location of high amplitude pressure waves with micro seismic events in the formation between the wellbores to understand fracture length, azimuth and growth rate of individual fractures in a formation when communicating with an adjacent or offset wellbore instrumented with a fiber optic sensing system.

FIG. 1 illustrates an example of a well system 100 for performing a stimulation operation according to the principles of the current disclosure. The well system 100 includes a wellbore 105 in a subterranean formation 110 beneath a ground surface 115. As illustrated, the wellbore 105 may include a horizontal wellbore. However, a well system 100 may include any combination of horizontal, vertical, slant, curved, or other wellbore orientations. Additionally, wellbore 105 may be disposed or positioned in a subsea environment. The well system 100 may include one or more additional treatment wells, monitoring wells, or other types of wells. The computing subsystem 125 may include one or more computing devices or systems located at the wellbore 105, in other locations, and combinations thereof. The computing subsystem 125, or any of its components, may be located apart from the other components shown in FIG. 1. For example, the computing subsystem 125 may be located at a data processing center, a computing facility, or another suitable location.

The subterranean formation 110 may include a reservoir that contains hydrocarbon resources, such as oil, natural gas, or others. For example, the subterranean formation 110 may include all or part of a rock formation (for example, shale, coal, sandstone, granite, or others) that contains natural gas. The subterranean formation 110 may include naturally fractured rock or natural rock formations that are not fractured to a significant degree. In some instances, the subterranean formation 110 may include tight gas formations that include low permeability rock.

The well system 100 may comprise an injection system 120. The injection system 120 may be used to perform an injection treatment, whereby fluid is injected into the subterranean formation 110 through the wellbore 105. The injection treatment may fracture and/or stimulate part of a rock formation or other materials in the subterranean formation 110, and in such instances, fracturing the rock may increase the surface area of the formation, which may increase the rate at which the formation conducts fluid resources to the wellbore 105. For example, a fracture treatment may augment the effective permeability of the rock by creating high permeability flow paths that permit native fluids (for example, hydrocarbons) to flow out of the reservoir rock into the fracture and flow through the reservoir to the wellbore 105. The injection system 120 may perform the introduced method, which is described further below with FIG. 3, to achieve desirable complex fracture geometries in the subterranean formation 110.

During a hydraulic fracturing operation, an injection or fracture treatment may be applied at a single fluid injection location or at multiple fluid injection locations in a subterranean zone, and the fluid may be injected over a single time period or over multiple different time periods. In some examples, a fracture treatment may use multiple different fluid injection locations in a single wellbore, multiple fluid injection locations in multiple different wellbores, and any combination thereof. Moreover, the fracture treatment may inject fluid through any suitable type of wellbore, such as, for example, vertical wellbores, slant wellbores, horizontal wellbores, curved wellbores, and any combination of thereof.

The injection system 120 may inject a treatment fluid into the subterranean formation 110 from the wellbore 105. The injection system 120 may comprise one or more instrument trucks 130, one or more pump trucks 135, and an injection/treatment control subsystem 140, without limitation. The injection system 120 may apply injection treatments that include, but are not limited to, a multi-stage fracturing treatment, a single-stage fracture treatment, a mini-fracture test treatment, a follow-on fracture treatment, a re-fracture treatment, a final fracture treatment, other types of fracture treatments, and any combination thereof.

The one or more pump trucks 135 may include mobile vehicles, immobile installations, skids, hoses, tubes, fluid tanks, fluid reservoirs, pumps, valves, mixers, or other types of structures and equipment. The one or more pump truck 135 may include one or more surface pumping/pulse generating equipment 137, such as one or more positive displacement pumps disposed about the pump truck 135. In the illustrated example, one or more electrical and diesel pumps are utilized as the surface pumping/pulse generating equipment 137. In other examples, a plunger-type (pulsing) pump and piezoelectric transducer, which may be electrically driven with variable and user selectable frequency and amplitude spectrums, may be also utilized as the surface pumping/pulse generating equipment 137. The surface pumping/pulse generating equipment 137 may be manually operated and/or controlled by the injection treatment control subsystem 140, and/or the computing subsystem 125.

The pump trucks 135 may supply treatment fluid or other materials for the injection treatment. The pump trucks 135 may contain treatment fluids, proppant materials, and other materials (collectively referred to herein as "fluids 143") for use in one or more stages of a stimulation treatment. The pump trucks 135 may communicate the fluids 143 into the wellbore 105 at or near the level of the ground surface 115 with the surface pumping/pulse generating equipment 137. The fluids 143 are communicated through the wellbore 105 from the ground surface 115 level by a conduit 145 installed in the wellbore 105. The conduit 145 may include casing cemented to the wall of the wellbore 105. In some implementations, all or a portion of the wellbore 105 may be left open, without casing. The conduit 145 may include a working string, coiled tubing, sectioned pipe, or other types of conduit.

The instrument trucks 130 may comprise a mobile vehicle, an immobile installation, any other suitable structure and any combination thereof. The instrument trucks 130 may comprise the injection treatment control subsystem 140. The instrument trucks 130 may be communicatively coupled to the pump trucks 135 via one or more communication links 150. In some examples, the communications links 150 may comprise a direct or indirect, wired or wireless connection and allow the injection treatment control subsystem 140 to communicate with and control the one or more surface pumping/pulse generating equipment 137. The communication links 150 may also allow the injection treatment control subsystem 140 or any other component of the instrument trucks 130 to communicate with other equipment at the ground surface 115. Additional communication links (not illustrated) may allow the instrument trucks 130 to communicate with sensors or data collection apparatuses in the well system 100, remote systems, other well systems, equipment installed in the wellbore 105 or other devices and equipment.

The injection treatment control subsystem 140 may include data processing equipment, communication equipment, or other systems that control injection treatments applied to the subterranean formation 110 through the wellbore 105. The injection treatment control subsystem 140 may be communicatively coupled to the surface pumping/pulse generating equipment 137, a fiber optic sensing system 180, and one or more pressure sensors 153 via a communication link 150 (not illustrated). The injection treatment control subsystem 140 may communicate with the surface pumping/pulse generating equipment 137 and the fiber optic sensing system 180 to monitor the acoustic response of the created wave and control the location of the created wave by altering one or more operating parameters of the surface pumping/pulse generating equipment 137.

In the illustrated example, the injection treatment control subsystem 140 may determine and control the location of the created standing wave in real-time based on measurements obtained during the injection treatment. For example, observed pressure and/or strain measurements from the fiber optic sensing system 180 along the length of the wellbore 105 may be used to determine when and in what manner to change the one or more operating parameters of the surface pumping/pulse generating equipment 137 to precisely place the created pressure wave at the desired location within the wellbore. The selection and extent of change for the operating parameters may be determined using a data driven model that built based on surface and subsurface data collected using the injection system 120 and is hence constrained by the current frac spread at the wellbore 105.

The injection system 120 may comprise the fiber optic sensing system 180 that is installed downhole along the length of wellbore 105. In the illustrated example, the fiber optic sensing system 180 is cemented in-place in an annular space between the subterranean formation 105 and a casing of the wellbore. In alternate embodiments, the fiber optic sensing system 180 may be retrievably disposed downhole. In one or more embodiments, the fiber optic sensing system 180 may measure the parameters of interest, such as pressure, within the wellbore using various optical fiber sensors.

The fiber optic sensing system 180 may be: Distributed Temperature Sensing (DTS) systems, Distributed Acoustic Sensing (DAS) Systems, and/or Distributed Strain Sensing (DSS) Systems. For an amplitude based sensing systems like a DTS system, it may operates based on Raman scattering; for a phase sensing based systems like a DAS system, it may operate based on interferometric sensing using e.g. homodyne or heterodyne techniques where the system may sense phase or intensity changes due to constructive or destructive interference; and for a strain sensing system like a DSS system may operate based on dynamic strain measurements based on interferometric sensors or static strain sensing measurements based on Brillouin scattering.

In addition to the above fiber optic sensing systems, quasi-distributed sensing systems where multiple single point sensors are distributed along an optical fiber/cable, or single point sensing systems where the sensors are located at the end of the cable may also be used. The quasi-distributed sensing system may use e.g. Fiber Bragg Gratings (FBGs) where a wavelength shift is detected or multiple FBGs to form Fabry-Perot type interferometric sensors for phase or intensity based sensing, and a single point fiber optic sensing system may operate using Fabry-Perot, FBG or intensity based sensors.

It is understood that FBG's are partial reflectors that can be used as temperature and strain sensors or be used to make various interferometric sensors with very high sensitivity. FBG's can be used to make point or quasi-distributed sensing system where these FBG based sensors can be used independently or with other types of fiber optic based sensors. FBG's can be manufactured into an optical fiber at a specific wavelength, and other system like DAS, DSS or DTS systems may operate at different wavelengths in the same fiber and measure different parameters simultaneously as the FBG based systems using Wavelength Division Multiplexing (WDM) and/or Time Division Multiplexing (TDM).

The fiber optic sensing system 180 may operate based on e.g. Optical Time Domain Reflectometry (OTDR) principles or Optical Frequency Domain Reflectometry (OFDR) principles. OTDR based systems are pulsed where one or more optical pulses may be transmitted down an optical fiber and backscattered light (Rayleigh, Brillouin, Raman etc.) is measured and processed. Time of flight for the optical pulse(s) indicate where along the optical fiber the measurement is done. OFDR based systems operate in continuous wave (CW) mode where a tunable laser is swept across a wavelength range, and the back scattered light is collected and processed.

The optical fiber sensing system 180 may monitor the acoustic response of the standing wave over a very wide range of frequencies. In one example, the lower frequency range can be used to monitor strain at any localized point along the wellbore 105, which can be used to establish the length along the wellbore and amplitude of the created wave, and the full frequency range can be used to capture information regarding the acoustic response of the created wave. The magnitude of the acoustic response can be used to determine the amplitude of the wave, and the location of the acoustic response can be used to determine the location of the wave. The length along the wellbore and amplitude of the acoustic response can be used to determine the shape of the created standing wave.

It is understood that although not specifically illustrated, the well system 100 may include other equipment of a frac spread/fleet. For example, the system 100 may include one or more low pressure fluid manifolding from fluid tanks to a blending unit, one or more proppant storage and delivery systems, one or more blenders, multiple manifold system connecting the blenders to the pumps and the pumps to the wellhead, one or more manifold/quick change systems enabling rapid changing from one wellhead to another for zipper fracturing operations, a wireline unit for setting plugs and perforating, one or more crane to assist with moving the wireline lubricator from one wellhead to another, additional set of pumps to pump down the wireline in a horizontal wellbore, and one or more isolation plugs and perforating guns.

Figure 2:
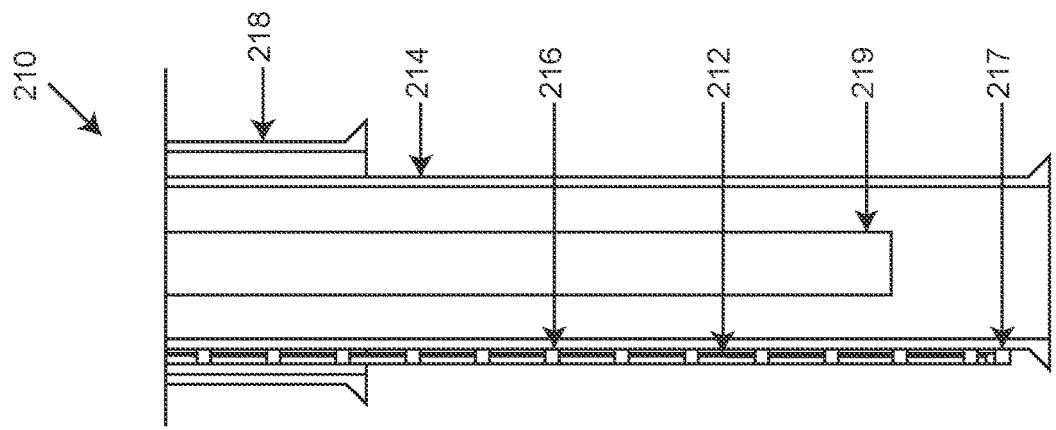
FIG. 2 illustrates examples of an optical fiber sensing system for monitoring a response of a standing wave in a wellbore over a wide range of frequencies according to the principles of the current disclosure.
Figure 2:
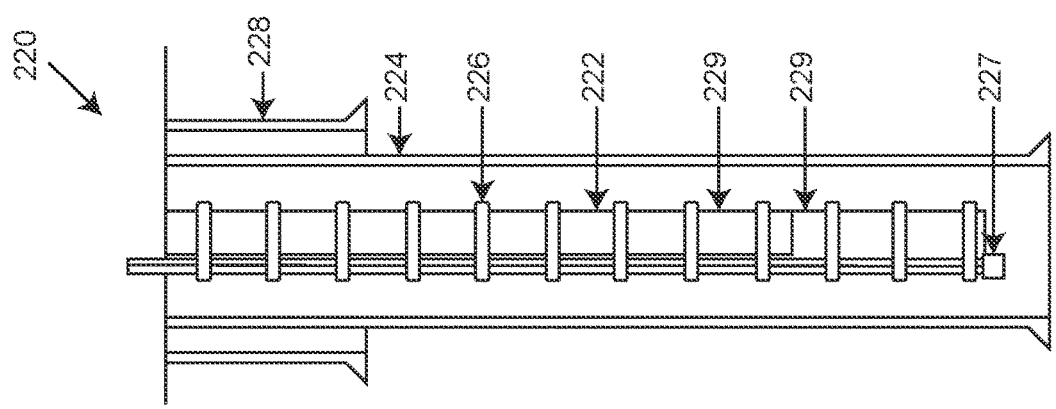
Figure 2:
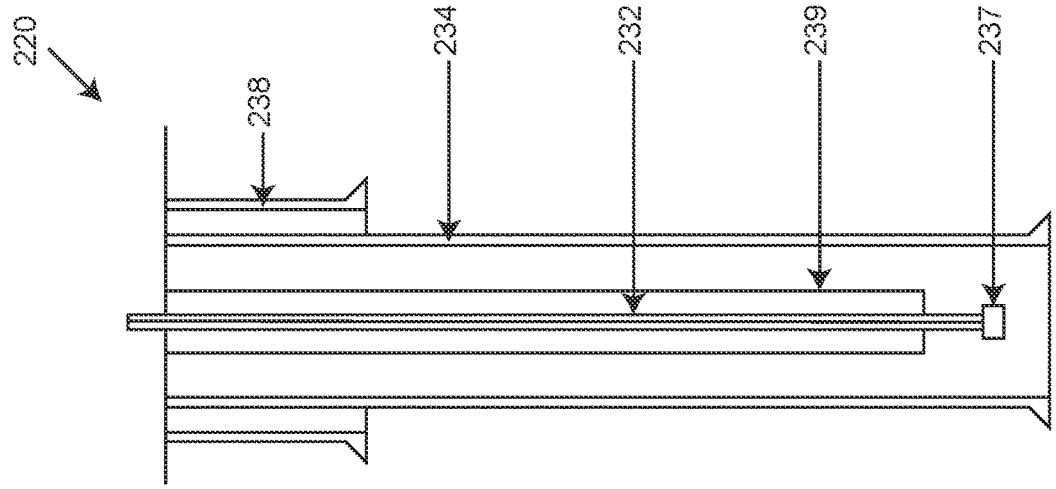

FIG. 2 illustrates examples 210, 220, and 230 of an optical fiber sensing system, such as 180 in FIG. 1, that may be used to monitor an acoustic response of a standing wave in a wellbore according to the principles of the current disclosure. The examples 210 and 220 represent permanently installed optical fiber sensing systems and the example 230 represents a retrievable optical fiber sensing system. Each example 210, 220, 230 includes fiber optic cables 212, 222, 232 that may house one or several optical fibers, such as single mode fibers, multi-mode fibers or a combination of single mode and multi-mode optical fibers.

The permanently installed systems 210 and 220 may include fiber optic cables 212, 222 that may be cemented in place in the annular space between a production casing 214 and formation or conveyed with a tubing 229. In the illustrated examples, each production casing 214, 224, and 234 is partially enclosed by a surface casing 218, 228, and 238 and extends into the wellbore. For the casing-coupled system 210, the fiber optic cables 212 may be clamped to the outside of the casing 214 during the deployment and protected by centralizers and cross coupling clamps 216 during Run-In-Hole (RIH). For the tubing-coupled system 220, the fiber optical cable 222 may be clamped to the outside of the tubing 229 that may extend below the bottom perforation using the cross-coupling clamps 226. In each example, the fiber optic cable 212, 222, 232 has a terminal end equipped with a bottom hole gauge carrier with PT gauge 217, 227, 237.

For the retrievable sensing system 230, the fiber optic cable 232 may be coupled to a wireline, slickline, or cables deployed inside coiled tubing. The fiber optic cables 232 may be deployed in a wellbore using gravity where a weight or conveyance vehicle is dropped into the wellbore and the fiber optical cables 232 are released as the deployment vehicle moves down the wellbore. The fiber optic cables 232 may be deployed from the surface or from a coil in the deployment vehicle. Gravity based deployment vehicles may be pumped into horizontal well bores in some instances.

Figure 3:
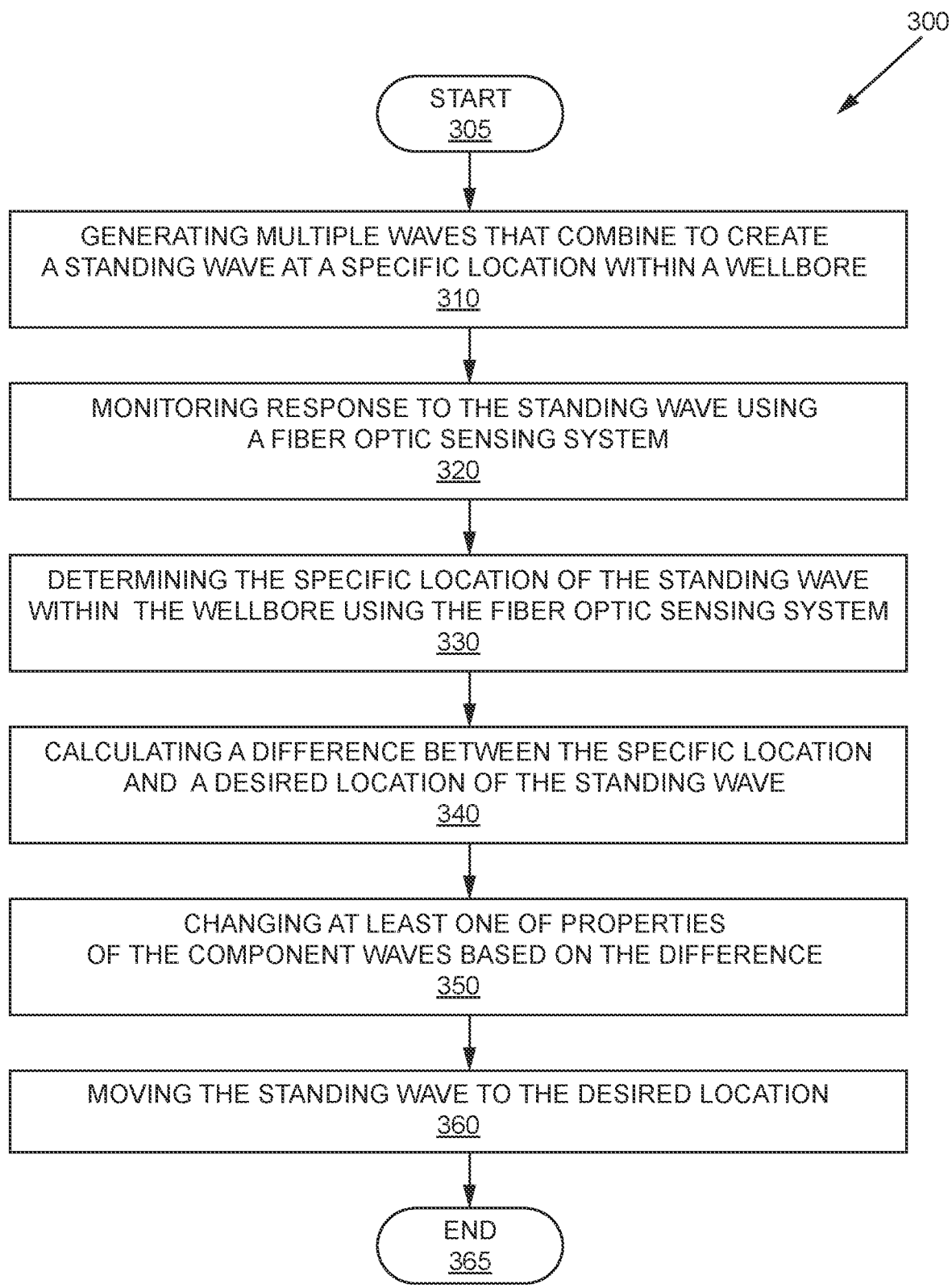
FIG. 3 illustrates an example of a method for performing a stimulation operation according to the principles of the current disclosure.

FIG. 3 illustrates an example of a method 300 for performing a stimulation operation according to the principles of the current disclosure. The method 300 may be performed using an injection system, such as 120 in FIG. 1. The method 300 starts at step 305.

At step 310, multiple pressure waves or pulses that combine and create a standing wave at a specific location within a wellbore are generated. The multiple pressure waves may be generated using one or more of surface pumping and/or pulse generating equipment, such as 137 in FIG. 1. Each of the generated pressure waves have respective frequency, amplitude and waveform. It is understood that the term "generated waves/pulses" refer to component waves that have been generated to combine into a standing wave having an amplitude that is larger than the amplitudes of any of the component waves.

The one or more surface pumping and/or pulse generating equipment may include one or more positive displacement pumps, such as a diesel or electrical pump, one or more plunger-type (pulsing) pumps, and one or more piezoelectric transducers. It is understood that surface pumping or pulse generating equipment is not limited to those mentioned before and include other equipment that is capable of moving fluid and/or generating pressure pulse in the moving fluid.

In one instance, the standing wave may be created at a specific location within the wellbore by continuously generating multiple pressure waves into the fluid using one or more surface pumping and/or pulse generating equipment. For example, while pumping fluid into a wellbore, an RPM and/or a gear of one or more of the surface pumping and/or pulse generating equipment may be adjusted to vary one or more frequencies and/or amplitudes of one or more of the multiple continuous pressure waves and/or one or more phases between the multiple continuous pressure waves such that the multiple pressure waves interfere with one another constructively and create a standing wave.

In another instance, the standing wave may be created at a specific location within the wellbore by intermittently generating a train of pressure waves/pulses into the fluid using one and/or more surface pumping or pulse generating equipment. For example, when pulsing a train of pulses into the fluid, one or more of the surface pumping and/or pulse generating equipment may be operated intermittently to introduce a delay between the pulses such that the pulse that is being reflected off a frac plug and traveling back toward the surface overlaps with another pulse that is traveling down towards the frac plug and creates a standing wave as a result of constructive pressure interference.

It is understood that the ways of creating a standing wave within a wellbore are not limited to the above instances and include others. It is also understood that as the amplitude of the created standing wave is greater than any amplitude of the generated waves, it would allow an operator to break down and fracture the targeted portion of the formation with lower total hydraulic horse power (HHP) requirements and lower pressure rated surface equipment than before.

At step 320, a response to the standing wave is monitored by interrogating optical fibers of a fiber optic sensing system. The response may correspond acoustic and/or mechanical variations in the optical fibers as the standing pressure wave changes the pressure along the length of the wellbore and across the perforations. The response may be a time series data, such as measurements from a 10 km fiber being interrogated at 10 kHz sampling rate by a DAS system. It is understood that different sampling rates may be used if different types of fiber optic sensing systems are used.

In the illustrated method 200, a permanently installed fiber optic sensing system, e.g., a DAS 180 in FIG. 1, which is cemented outside of a casing that extends the length of a treatment or monitoring wellbore, is utilized. In addition to or in alternative to a permanently installed fiber optic sensing system, a non-permanent fiber optic sensing system, such as a wireline/slickline/coiled tubing deployed fiber optic sensing system, may be utilized.

It is understood that the fiber optic sensing system that may be used with the method 300 is not limited to a DAS and may include other fiber optic sensing system, such as a DSS system and a DTS system along with fiber optic sensing systems comprising FBG based pressure gauges, such as Slimline gauges. In some instances, frac plugs may be instrumented with pressure sensors, whose readings may be acoustically communicated to one or more optical fibers of the fiber optic sensing system for additional pressure measurements.

At step 330, the specific location within the wellbore at which the standing wave has been created is determined. The step 330 is performed based on the measurements from the fiber optic sensing system, such as the DAS system. A lower frequency range of the fiber optic sensing system, e.g., below 10 HZ to milli Hz range, can be used to monitor strain at any localized point along the wellbore, and the full frequency range of the system can be used to capture information regarding the response of the created wave within the wellbore. The step 330 may be performed at the surface or at the source of the generated waves using the processor/CPU of the injection treatment control subsystem.

The location of the standing wave may be identified as a variation in measurements compared to other segments of the optical fiber or to a baseline, which is measured before the standing wave is introduced. The measurements can be converted from time domain to frequency domain using Fast Fourier Transform (FFT), or other transforms like wavelet transform when different domains are involved. In one example, the location of the standing wave may be determined by looking at the frequency content where the presence of higher amplitude frequencies indicate the location of the standing wave. As a standing wave along the wellbore may generate periodic signals in the time series and/or frequency domain data, the location of the standing wave may also be determined by correlating the measurements to perforations or perforation clusters, and in some instances to other wellbore or completion features like casing collars or gauge mandrels etc.

In addition to determining the location of the standing wave, the measurements from the fiber optic sensing system may be used many different purposes. For example, when a DAS system is used, the measurements from a low frequency range may indicate formation strain changes or temperature changes due to fluid movement, and other frequency ranges may indicate fluid or gas movement. Various filtering techniques and models may be applied to generate indicators of events that may be of interest. Indicators may include formation movement due to growing natural fractures, formation stress changes during the fracturing operations ("stress shadowing"), fluid seepage during the fracturing operation (as formation movement may force fluid into an observation well), fluid flow from fractures, fluid and proppant flow from frac hits. Each indicator may have a characteristic signature in terms of frequency content and/or amplitude and/or time dependent behavior, and these indicators may also be present at other measurements from other types of the fiber optic sensing system. Fiber optic cables used with the DAS systems may include enhanced back scatter optical fibers where the Rayleigh backscatter may be increased by 10× or more with associated increase in Optical Signal to Noise Ratio (OSNR).

When the measurements are taken from the DAS system, they can also be used to detect various seismic events where stress fields and/or growing fracture networks generate micro seismic events or where perforation charge events may be used to determine travel time between horizontal wells and this information can be used from stage to stage to determine changes in travel time as the formation is fractured and filled with fluid and proppant. When used with surface seismic sources to generate Vertical Seismic Profiles (VSPs) before, during and after a fracturing job, the effectiveness of the fracturing job as well as the production effectiveness may be determined. VSPs and reflection seismic surveys may be used over the life of a well and/or reservoir to track production related depletion and/or track e.g. water/gas/polymer flood fronts.

When measurements are taken from a DSS system, they can be used to determine absolute strain changes over time. Static strain data is often measured using Brillouin based systems or quasi-distributed strain data from FBG based system. Static strain may be used to determine propped fracture volume by looking at deviations in strain data from a measured strain baseline before fracturing a stage. It may also be possible to determine formation properties like permeability, poroelastic responses and leak off rates based on the change of strain vs time and the rate at which the strain changes over time, e.g. hours to days. Slowly varying dynamic strain data during a frac stage can be used in real-time to detect fracture growth through an appropriate inversion model, and appropriate actions like changes to fluid flow rates in the treatment well. Addition of diverters or chemicals into the fracturing fluid or changes to proppant concentrations or types can then also be used to mitigate detrimental effects.

From the measurements of the fiber optic sensing system, changes in the standing wave caused by changes within the wellbore, such as changes in perforation clusters, can be detected and used for in-depth understanding of the pressure wave interference at each one of these perforation clusters. The level of the interference can be interpreted as changes in the flow conditions within the well caused by the change in conditions created by the perforations. The measurements can also be used to optimize perforation design, e.g., a number of cluster per stage, a number of perforations per cluster and a total number of clusters, and to optimize stage length based on the number of clusters per stage.

At step 340, a difference between the specific location of the standing wave and a desired location of the standing wave is calculated. The desired location may refer to a specific depth or portion of the well that is being targeted in a given operation, e.g., a stimulation operation. For example, the desired location may refer to a specific perforation or cluster of perforations within a wellbore that a given operation is selectively targeting to break down or fracture for a near wellbore cleanup operation or to place chemicals, such as scale inhibitor, surfactants, acid, and/or proppant laden fluids, for re-frac operation. The step 240 may be performed using the processor/CPU of the injection treatment control subsystem.

At step 350, at least one property of at least one of the generated waves is adjusted to create the standing wave at or near the desired location based on the difference determined at step 340. The location of the standing wave may be precisely controlled, e.g., to be within a few feet of the desired location, to direct a node and an anti-node of the standing wave to respective perforations in the desired location. The properties of the waves that may be changed include an amplitude, a frequency and a waveform of one or more of the generated waves, and a phase and a delay therebetween.

The properties of the generated waves may be changed by altering one or more operating parameters of the surface pumping and/or pulse generating equipment using the injection treatment control subsystem. For a positive displacement pump, such as diesel or electrical pump, an RPM and/or a transmission gear of one or more of those pumps may be changed to control a rate function and/or a frequency of each pump. Each rate function may have sinusoidal or step type of behavior, and the functions can be combined to create a desired standing wave within a wellbore. For example, pumps operating at substantially similar rate functions and/or frequencies may be phase shifted to reduce or eliminate a specific frequency, and pumps may be tuned to generate specific frequencies.

For a piezoelectric transducer, a different frequency and/or amplitude may be selected independently or in combination with the pumps to create a waveform that cannot created by the pumps or the transducers alone and place nodes and anti-nodes of the created waveform at desired locations. For a pulse generating equipment such as plunger-type pump, a delay between pulses may be adjusted to generate constructive pressure interference between the outgoing pulses and the returning (reflected) pulses, e.g., pulses being reflected off frac plugs, and determine and control how far from the frac plug this constructive pressure interference happens. For example, as each pump with a different configuration, e.g., 3 plunger or 5 plunger configurations, will have a different natural frequency, running these pumps at similar, but slightly different flow rates/RPM and manipulating their frequency difference can create a harmonic effect that will create one or more standing waves.

A selection and a degree/extent to which the operating parameters need to be changed and/or the amount of delay and/or phase between the pulses may be determined using a computer simulation model that is built based on surface and subsurface data collected using the given injection system and is hence constrained by a number of frac spread specific variables of the well.

In addition or in alternative to one or more properties of the one or more generated waves, the chemical composition of the pumping fluid may be adjusted to create the standing wave at the desired location in other examples. For instance, concentrations of friction reducer, which changes the speed of sound through the fluid, and gas and/or sand, which shifts the frequency, may be adjusted. It is understood that the ways and principles under which the desired location of a standing wave may be estimated and relocated are not limited to the ones disclosed in the current disclosure and may include others.

At step 360, the standing wave is moved to the desired location using the one or more changed operating parameters of the one or more the surface pumping and/or pulse generating equipment. Moving the standing wave at the desired location allows the method 300 to improve the stimulation operation, such as a hydraulic fracturing treatment, because the precisely placed standing wave can break down or fracture a specific portion of a wellbore with lower total hydraulic horse power (HHP) requirements and hence with lower pressure rated surface equipment.

Moving the standing wave to the desired location can also improve the stimulation operation by sweeping a node or anti-node of the standing wave across the perforations at the desired location and balancing fluid entering the perforations. As the sweeping causes a local pressure oscillation of the fluid entering perforations at the cluster, which can enhance fracture growth with an anti-node or slow the growth with a node, the method 300 can control the sweeps and adjust a ratio of local pressure oscillations between different perforation clusters, balancing fluid entering the different perforation clusters. It is understood that a diversion operation may be also improved by the sweeps as an anti-node of the standing wave may be swept across some of the perforations that need to take a diverter.

It is understood that the method 300 can correlate timing and perforation location of the standing wave with micro seismic events in the formation between the wellbores. This enables understanding fracture length, azimuth and growth rate of individual fractures in a formation when communicating with an adjacent or offset wellbore instrumented with permanent, wireline deployed or disposable fiber optic sensors.

In addition to the location of the standing wave, the treatment well pressure, rate, proppant concentration, diverters, fluids and chemicals may be altered to improve the hydraulic fracturing treatment. The impacts of these factors, such as stress field changes, fracture growth rate changes and corresponding changes in measured micro seismic events and their distributions, changes in measured strain, slow pressure changes due to poroelstisc effects, and/or changes in treatment rates and pressure, may be measured and managed using the fiber optic sensing system.

The method 300 may be performed while the injection system is in a monitoring mode where perforations and fluid flow may be characterized based on the measurements before/during/after treatment and also while the injection system is in a treatment mode where fluid flow or fracture treatment characteristics are adjusted in real-time based on the actively adjusted operating parameters. When the monitoring and/or treating is finished, the method 300 proceeds to end at step 365.

Figure 4:
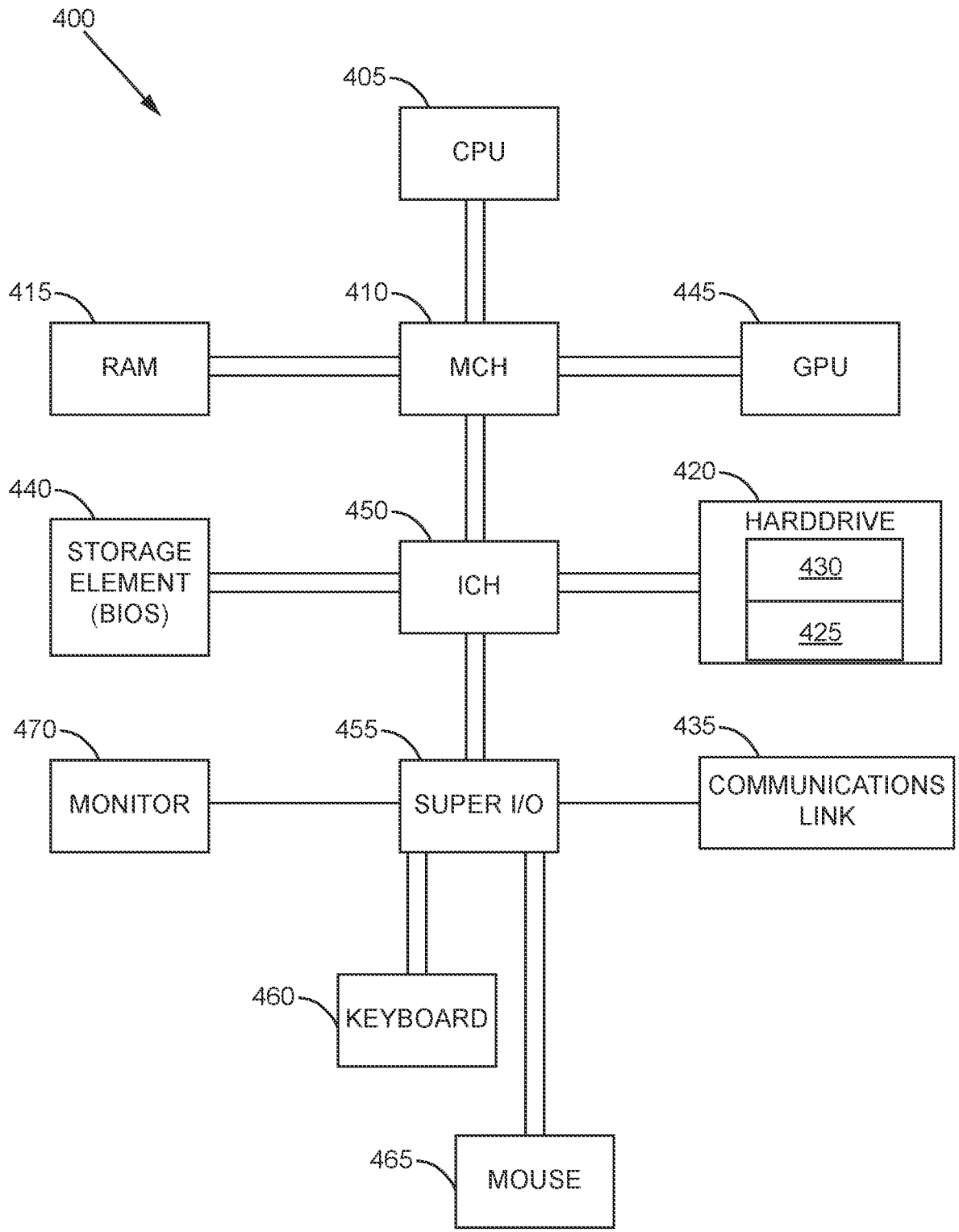
FIG. 4 illustrates an example of an injection treatment control subsystem implemented according to the principles of the current disclosure.

With reference now to FIG. 4, a diagram is shown illustrating an example injection treatment control subsystem, such as 140 in FIG. 1, implemented according to the principles of the current disclosure. A processor or central processing unit (CPU) 405 of the injection treatment control subsystem 140 is communicatively coupled to a memory controller hub (MCH) or north bridge 410. The processor 405 may include, for example a microprocessor, microcontroller, digital signal processor (DSP), application specific integrated circuit (ASIC), or any other digital or analog circuitry configured to interpret and/or execute program instructions and/or process data. The processor 405 may be configured to interpret and/or execute program instructions or other data retrieved and stored in any memory such as the memory 415 or hard drive 420. Program instructions or other data may constitute portions of a software or application, for example application 425 or data 430, for carrying out one or more steps/operations of the method described herein, such as the method 300 in FIG. 3. The memory 415 may include read-only memory (ROM), random access memory (RAM), solid state memory, or disk-based memory. Each memory module may include any system, device or apparatus configured to retain program instructions and/or data for a period of time (for example, non-transitory computer-readable media). For example, instructions from a software or application 425 or data 430 may be retrieved and stored in the memory 415 for execution or use by the processor 405. In one or more examples, the memory 415 or the hard drive 420 may include or comprise one or more non-transitory executable instructions that, when executed by the processor 405, cause the processor 405 to perform or initiate one or more operations or steps of the described method, such as the method 300 in FIG. 3.

The data 430 may include treatment data, geological data, fracture data, micro seismic data, or any other appropriate data. The one or more applications 425 may include a fracture design model, a reservoir simulation tool, a fracture simulation model, or any other appropriate applications. In one or more examples, the data 430 may include treatment data relating to fracture treatment plans. In one or more examples, the data 430 may include geological data relating to one or more geological properties of the subterranean formation, such as 110 in FIG. 1. For example, the geological data may include information on a treatment wellbore, such as the wellbore 105 in FIG. 1, and/or the monitoring well, completions, or information on other attributes of the subterranean formation 110. The geological data may include information on the lithology, fluid content, stress profile, pressure profile, spatial extent, or other attributes of one or more rock formations in the subterranean zone. The geological data may also include information collected from well logs, rock samples, outcroppings, micro seismic imaging, or other data sources. In one or more examples, the data 430 include fracture data relating to fractures in the subterranean formation 110. The fracture data may identify the locations, sizes, shapes, and other properties of fractures in a model of a subterranean zone. The fracture data can include information on natural fractures, hydraulically-induced fractures, or any other type of discontinuity in the subterranean formation 110. The fracture data can include fracture planes calculated from micro seismic data or other information. For each fracture plan, the fracture data can include information (for example, strike angle, dip angle, etc.) identifying an orientation of the fracture, information identifying a shape (for example, curvature, aperture, etc.) of the fracture, information identifying boundaries of the fracture, or any other suitable information.

The one or more applications 425 may comprise one or more software applications, one or more scripts, one or more programs, one or more functions, one or more executables, or one or more other modules that are interpreted or executed by the processor 405. For example, the one or more applications 425 may include a fracture design module, a reservoir simulation tool, a hydraulic fracture simulation model, or any other appropriate function block. The one or more applications 425 may include machine-readable instructions for performing one or more of the operations related to any one or more embodiments of the current disclosure. The one or more applications 425 may include machine-readable instructions for generating a user interface or a plot, for example, illustrating fracture geometry, pressure plot, hydrocarbon production performance. The one or more applications 425 may obtain input data, such as treatment data, geological data, fracture data, or other types of input data, from the memory 415, from another local source, or from one or more remote sources (for example, via the one or more communication links 435). The one or more applications 425 may generate output data and store the output data in the memory 415, the hard drive 420, in another local medium, or in one or more remote devices (for example, by sending the output data via the communication link 435).

The memory controller hub 410 may include a memory controller for directing information to or from various system memory components within the injection treatment control subsystem, such as the memory 415, a storage element 440, and the hard drive 420. The memory controller hub 410 may be coupled to the memory 415 and a graphics processing unit (GPU) 445. The memory controller hub 410 may also be coupled to an I/O controller hub (ICH) or south bridge 450. The I/O controller hub 450 is coupled to storage elements of the injection treatment control subsystem, including the storage element 440, which may comprise a flash ROM that includes a basic input/output system (BIOS) of the computer system. The I/O controller hub 450 is also coupled to the hard drive 420 of the injection treatment control subsystem. The I/O controller hub 450 may also be coupled to an I/O chip or interface, for example, a Super I/O chip 455, which is itself coupled to several of the I/O ports of the computer system, including a keyboard 460, a mouse 465, a monitor 470 and one or more communications link 435. Any one or more input/output devices receive and transmit data in analog or digital form over one or more communication links 435 such as a serial link, a wireless link (for example, infrared, radio frequency, or others), a parallel link, or another type of link. The one or more communication links 435 may comprise any type of communication channel, connector, data communication network, or other link. For example, the one or more communication links 435 may comprise a wireless or a wired network, a Local Area Network (LAN), a Wide Area Network (WAN), a private network, a public network (such as the Internet), a Wi-Fi network, a network that includes a satellite link, or another type of data communication network.

Modifications, additions, or omissions may be made to FIG. 4 without departing from the scope of the present disclosure. For example, FIG. 4 shows a particular configuration of components of the injection treatment control subsystem. However, any suitable configurations of components may be used. For example, components of the injection treatment control subsystem may be implemented either as physical or logical components. Furthermore, in some embodiments, functionality associated with components of the injection treatment control subsystem may be implemented in special purpose circuits or components. In other embodiments, functionality associated with components of the injection treatment control subsystem may be implemented in configurable general-purpose circuit or components. For example, components of the injection treatment control subsystem may be implemented by configured computer program instructions.

Those skilled in the art to which this application relates will appreciate that other and further additions, deletions, substitutions and modifications may be made to the described embodiments.

What is claimed is:

1. A method comprising:
    generating pressure waves that combine to create a standing wave at a specific location within a wellbore using surface pumping/pulse generating equipment;
    monitoring a response of the standing wave by making measurements along the length of the wellbore using a fiber optic sensing system;
    determining a difference between the specific location and a desired location of the standing wave within the wellbore based on the measurements; and
    adjusting one or more properties of one or more of the pressure waves based on the difference between the specific and desired locations to move the standing wave to the desired location.

2. The method of claim 1, wherein the method is performed using an injection system.

3. The method of claim 1, wherein said generating includes continuously generating the pressure waves using the surface pumping and/or pulse generating equipment.

4. The method of claim 1, wherein said generating includes intermittently generating the pressure waves using the surface pumping and/or pulse generating equipment.

5. The method of claim 1, wherein the one or more properties of the one or more pressure waves are selected from the group consisting of: one or more frequencies of the one or more pressure waves, one or more amplitudes of the one or more pressure waves, one or more phases between the pressure waves, or one or more delays between the pressure waves.

6. The method of claim 1, wherein the surface pumping and/or pulse generating equipment includes one or more positive displacement pumps, one or more pulsing pumps, and/or one or more piezoelectric transducers.

7. The method of claim 1, wherein the fiber optic sensing system includes a system selected from the group consisting of: a distributed acoustic sensing (DAS) system, a distributed strain sensing (DSS) system, a distributed temperature sensing system, a quasi-distributed sensing system, or a single point sensing system.

8. The method of claim 1, further comprising determining the specific location based on a comparison between the measurements and baseline measurements.

9. The method of claim 1, further comprising determining the specific location by transforming the measurements from one domain to another domain and comparing amplitudes of the measurements to one another.

10. The method of claim 1, further comprising determining the specific location by transforming the measurements from one domain to another domain and correlating the measurements to perforations or features in the wellbore.

11. The method of claim 1, wherein said adjusting one or more properties includes altering one or more operating parameters of the surface pumping/pulse generating equipment.

12. The method of claim 11, wherein the operating parameters are selected from the group consisting of: a revolution per minute (RPM), a transmission gear, a selectable frequency and amplitude of the surface pumping/pulse generating equipment, and a phase shift and a timing delay between the pressure waves.

13. The method of claim 11, wherein said altering the one or more operating parameters includes selecting the one or more operating parameters and determining the altering of the selected one or more operating parameters using a computer model constrained by a frac spread at the wellbore.

14. An injection system comprising:
    one or more surface pumping/pulse generating equipment that generate pressure waves that combine to create a standing wave at a specific location within a wellbore;
    a fiber optic sensing system that monitors a response of the standing wave by making measurements along the length of the wellbore; and
    an injection treatment control subsystem that performs, using the one or more surface pumping/pulse generating equipment and the fiber optic sensing system, operations including:
        determining a difference between the specific location and a desired location of the standing wave within the wellbore based on the measurements; and
        adjusting one or more properties of one or more of the pressure waves based on the difference between the specific and desired locations to move the standing wave to the desired location.

15. The system of claim 14, wherein the pressure waves are continuously generated.

16. The system of claim 14, wherein the pressure waves are intermittently generated.

17. The system of claim 14, wherein the one or more properties of the one or more pressure waves are selected from the group consisting of: one or more frequencies of the one or more pressure waves, one or more amplitudes of the one or more pressure waves, one or more phases between the pressure waves, or one or more delays between the pressure waves.

18. The system of claim 14, wherein the one or more surface pumping and/or pulse generating equipment includes one or more positive displacement pumps, one or more pulsing pumps, and/or one or more piezoelectric transducer.

19. The system of claim 14, wherein the fiber optic sensing system is selected from the group consisting of: a distributed acoustic sensing (DAS) system, a distributed strain sensing (DSS) system, a distributed temperature sensing system, a quasi-distributed sensing system, or a single point sensing system.

20. The system of claim 14, wherein the operations further include determining the specific location based on a comparison between the measurements and baseline measurements.

21. The system of claim 14, wherein the operations further include determining the specific location by transforming the measurements from one domain to another domain and comparing amplitudes of the measurements to one another.

22. The system of claim 14, wherein the operations further include determining the specific location by transforming the measurements from one domain to another domain and correlating the measurements to perforations or features in the wellbore.

23. The system of claim 14, wherein said adjusting the one or more properties includes altering one or more operating parameters of the surface pumping/pulse generating equipment.

24. The system of claim 23, wherein the one or more operating parameters include a revolution per minute (RPM), a transmission gear, selectable frequency and amplitude, and a phase shift and a timing delay between the multiple pressure waves.

25. The system of claim 23, wherein said altering the one or more operating parameters includes selecting the one or more operating parameters and determining an extent to which the selected parameters are to be altered using a computer model constrained by a frac spread at the wellbore.

* * * * *